(12) United States Patent
Weber et al.

(10) Patent No.: US 8,484,714 B2
(45) Date of Patent: Jul. 9, 2013

(54) METHOD AND RULE-REPOSITORY FOR GENERATING SECURITY-DEFINITIONS FOR HETEROGENEOUS SYSTEMS

(75) Inventors: Heiko Weber, Darmstadt (DE); Juliane Harbarth, Griesheim (DE)

(73) Assignee: Software AG, Darmstadt (DE)

( * ) Notice: Subject to any disclaimer, the term of this patent is extended or adjusted under 35 U.S.C. 154(b) by 1238 days.

(21) Appl. No.: 12/292,348

(22) Filed: Nov. 17, 2008

(65) Prior Publication Data

US 2010/0083348 A1   Apr. 1, 2010

(30) Foreign Application Priority Data

Sep. 29, 2008   (EP) .................................... 08017143

(51) Int. Cl.
*G06F 7/04* (2006.01)
(52) U.S. Cl.
USPC ................... 726/11; 726/4; 726/27; 709/220; 709/224

(58) Field of Classification Search
None
See application file for complete search history.

(56) References Cited

U.S. PATENT DOCUMENTS

| 6,751,509 | B2 | 6/2004 | Hirayama |
| 6,978,379 | B1 | 12/2005 | Goh et al. |
| 7,058,715 | B2 | 6/2006 | Jain et al. |
| 7,308,702 | B1 | 12/2007 | Thomsen et al. |
| 7,603,358 | B1 * | 10/2009 | Anderson et al. ..................... 1/1 |
| 8,056,114 | B2 * | 11/2011 | Allen et al. ....................... 726/1 |
| 2006/0010445 | A1 | 1/2006 | Peterson et al. |
| 2007/0056018 | A1 * | 3/2007 | Ridlon et al. ..................... 726/1 |

FOREIGN PATENT DOCUMENTS

| EP | 1 308 823 | 5/2003 |
| WO | WO 2008/103725 | 8/2008 |

* cited by examiner

*Primary Examiner* — Pramila Parthasarathy
(74) *Attorney, Agent, or Firm* — Nixon & Vanderhye PC

(57) ABSTRACT

A method for generating a system specific security-definition for a heterogeneous subsystem of a computing system is provided. A natural-language security-definition is stored in a rule-repository. A machine-readable security-definition is stored and a first mapping of a natural-language security-definition onto a machine-readable security-definition is stored in the rule-repository. A system-specific security-definition is generated from a machine-readable security-definition by a rule-converter that corresponds to a heterogeneous subsystem. The generation is based on a second mapping of each machine-readable security definition onto indications of system-specific security-definitions.

17 Claims, 5 Drawing Sheets

Fig. 3

Figure 1:
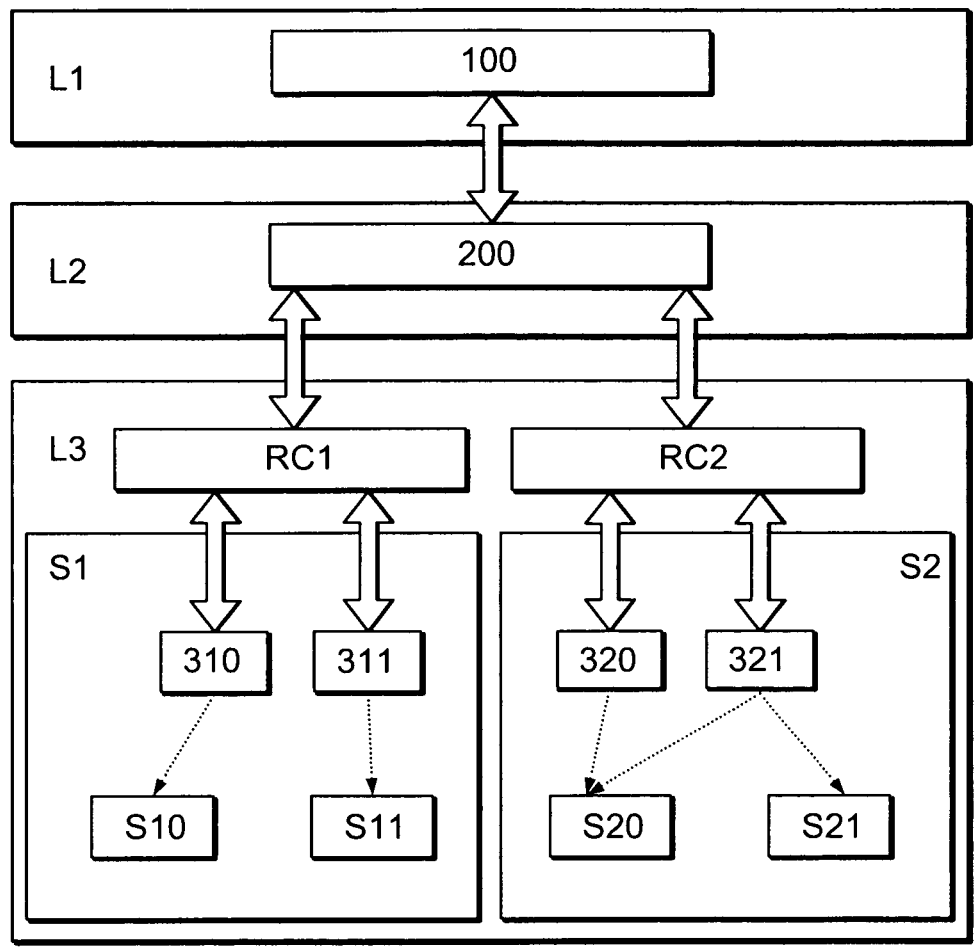

```
<nlrule ruleId="DevelopersReadRule">
  <rule>Grant read access to all developers on the data relating to the
  Project SYLT.</rule>
  <layermapping layer2Id="DevelopersReadPolicy">
    <layer3mapping type="WebDAV-acl" id="DevelopersReadPolicyAcl1" />
    <layer3mapping type="Tamino-acl" id="developersreadysylt" />
    <layer3mapping type="Tamino-group" id="DevelopersGroup" />
  </layermapping>
</nlrule>
```

Fig. 4

```
     <Policy PolicyId="DevelopersReadPolicy"...>
       <Rule ... Effect="Permit">
         <Target>
5          <Subjects>
             <Subject>
               <SubjectMatch ...>
                 <AttributeValue ...>Developers<AttributeValue>
                 <SubjectAttributeDesignator ... />
10             </SubjectMatch>
             </Subject>
           </subjects>
           <Resources>
             <Resource>
15             <ResourceMatch ...>
                 <AttributeValue ...>SYLT</AttributeValue>
                 <ResourceAttributeDesignator ... />
               </ResourceMatch>
             </Resource>
20         </Resources>
           <Actions>
             <Action>
               <ActionMatch ...>
                 <AttributeValue ...>read</AttributeValue>
25               <ActionAttributeDesignator .../>
               </ActionMatch>
             </Action>
           </Actions>
         </Target>
30     </Rule>
     </Policy>
```

Fig. 5

```
     <D:acl xmlns:D="DAV;" id="DevelopersReadPolicyAcll">
30     <D:ace>
         <D:principal>
           <D:href>http://webdavserver/groups/Developers</D:href>
         </D:principal>
         <D:grant>
40         <D:privilege><D:read></D:privilege>
         </D:grant>
       </D:ace>
     </D:acl>
```

Fig. 6a

```
<ino:acl ino:aclname="developersreadysylt" xmlns:ino:="...">
  <ino:ace ino:access="read">SYLT</ino:ace>
</ino:acl>
```
5

Fig. 6b

```
<ino:group ino:groupname="DevelopersGroup" xmlns:ino:="...">
  <ino:aclref>developersreadsylt</ino:aclref>
```
10 `</ino:acl>`

METHOD AND RULE-REPOSITORY FOR GENERATING SECURITY-DEFINITIONS FOR HETEROGENEOUS SYSTEMS

This application claims priority to European Application No. 08017143.2 filed 29 Sep. 2008, the entire contents of which are hereby incorporated by reference.

1. TECHNICAL FIELD

The present invention relates to a method and a rule-repository for generating security-definitions for heterogeneous systems.

2. THE PRIOR ART

Today, huge software systems providing a large amount of diverse data are typically combinations of different heterogeneous subsystems such as internet portals, collections of different databases or registries, which makes the overall systems very complex. Heterogeneous in this context means that the subsystems each may have a completely different structure, underlying technology, data formats, processing concepts, etc.

In order to ensure the security of the data in such a composed software system, e.g. to ensure that only authorized parties have access to parts of the data or that only authorized personnel is allowed to perform certain system tasks, the subsystems typically each allow for the declaration of a set of security definitions. However, the heterogeneous subsystems might specify fine-grained security definitions by different technical means and conforming to different syntactic models. On the other hand, the overall security of the software system is likely to be the result of coarse-grained, global security intents, which have to be manually manifested by administration personnel in the multiple different fine-grained security definitions of each subsystem. Since a global security intend may likely affect multiple different subsystems, the various different security definitions have to be kept synchronized at all times in order to guarantee the security of the overall software system. Thus, even to a knowledgeable administrator, the overall set of a system's fine-grained security definitions may often appear as an incomprehensible collection of access privileges, which is difficult to maintain and results in the risk of security leaks of the overall software system.

In this context, the U.S. Pat. No. 7,058,715 describes how to manage access control within system topologies, in particular in storage-area networks. It discloses a formal mathematical model to group accessors and accessibles into proto-zones in order to facilitate the security management. Furthermore, the U.S. Pat. No. 6,751,509 discloses a method to achieve access control to tabular data organized in cells and aggregations of cells, especially in closed systems such as financial institutions. The document focuses on the derivation of aggregated access control rules on the same fine-grained abstraction-level.

It is therefore the technical problem underlying the present invention to facilitate the derivation of fine-grained security-definitions from more global security intents, thereby increasing the security of huge software systems comprised of heterogeneous subsystems and thereby at least partly overcoming the above explained disadvantages of the prior art.

3. SUMMARY OF THE INVENTION

This problem is according to one aspect of the invention solved by a method for generating one or more system-specific security-definitions for one or more heterogeneous subsystems of a software system. In the embodiment of claim 1, the method comprises the following steps:

a. storing one or more natural language security-definitions in a rule-repository;
b. storing one or more machine-readable security-definitions and a first mapping of each natural language security-definition onto one or more of the machine-readable security-definitions in the rule-repository; and
c. generating the one or more system-specific security-definitions from the one or more machine-readable security-definitions by one or more rule-converters corresponding to the one or more heterogeneous subsystems, wherein the generating is based on a second mapping of each machine-readable security-definition onto one or more of the system-specific security-definitions.

Accordingly, the embodiment defines a method which facilitates the generation of system-specific security-definitions specific to different heterogeneous subsystems of a software system. As explained in the introductory section, each subsystem might have its own method of establishing security and especially might have its own data model of storing security definitions, which makes it very difficult to achieve the overall security-intends of the overall system. To this end, the embodiment defines a three-layered architecture for security-definitions, including a meta-representation of the system-specific security-definitions:

Since every security-definition added to the system (as well as every update or deletion of such a definition) has an intent, i.e. follows some kind of rule, these rules are first explicitly formulated in natural language and stored in a rule-repository.

Secondly, the natural-language security-definitions are represented in a machine readable form in the rule-repository. These machine-readable security-definitions must describe the intent of the original natural-language definitions as precisely as possible and sufficiently generic. Furthermore, a mapping between those abstraction layers is provided. Preferably, the mapping maps one natural-language security-definition onto one machine-readable security-definition. However, other types of mappings are also possible, e.g. 1:m or even n:m mappings.

Lastly, in order to technically enforce the formulated security intents on the subsystem layer, a special rule-converter is provided preferably for each subsystem, which generates the system-specific security-definitions from the higher layer information according to a second mapping. The second mapping is preferably a 1:n mapping, however, other types of mappings are also possible, e.g. 1:1 or n:m mappings. Furthermore, the second mapping is for each of the one or more heterogeneous subsystems preferably automatically generated by the respective rule-converter.

Consequently, storing the security-definitions according to this three-layered security-architecture already has advantages in documenting changes to the security set, thus making it better maintainable. Additionally, the three-layered security-architecture provides a better understanding of which security-definitions exist and their intents and further achieves a synchronized generation of the fine-grained system-specific security-definitions from the more abstract security-intents. Thus, the overall security of the software system is improved through the enforcement of the security intents by the different system-specific security-definitions.

In one aspect of the present invention, the method further comprises the steps of storing one or more new system-specific security-definitions in the rule-repository and generating the one or more machine-readable security-definitions from the one or more new system-specific security-definitions by the one or more rule-converters according to the second mapping. Accordingly, the rule-converters may be able to convert the security-definitions in both directions. This enables a "reverse-engineering" of existing fine-grained security-definitions, which facilitates a better understanding of the security-definitions and makes the validation of existing configurations easier, thereby further increasing the overall security.

In another aspect, the method further comprises the steps of selecting at least one of the natural-language security-definitions and retrieving the one or more affected system-specific security-definitions according to the first and second mapping. A system-specific security-definition is affected by a natural-language security-definition in this context, if it was derived from it through one or more corresponding machine-readable security-definitions. In this aspect, the rule-repository may be thought of as a combined data basis of rules in layers 2 and 3, which is able to provide information of which actions have taken place with respect to security. This is especially advantageous when the security activities undertaken related to a natural-language security-definition do not have the desired effects and the system-specific security-definitions are of such quantity that they cannot be efficiently inspected manually. Additionally or alternatively, the method may comprise the further steps of selecting at least one of the system-specific security-definitions and retrieving the one or more affected natural-language security-definitions according to the first and second mapping.

Furthermore, the method may further comprise the steps of updating the one or more natural-language security-definitions and/or the one or more machine-readable security-definitions and the step of updating the corresponding system-specific security-definitions by the one or more rule-converters. This aspect enables the security-definitions at the different abstraction layers to be kept synchronized.

In addition to retrieving layer 3 definitions affected by layer 1 definitions as presented above, the method may further comprise the steps of updating one or more of the affected system-specific security-definitions, selecting the one or more affected system-specific security-definitions which have been updated, and retrieving the at least one natural-language security-definition which has updated the selected system-specific security definitions. Accordingly, this allows for a kind of "impact analysis" of new layer 1 definitions on existing layer 1 definitions.

In order to detect if a security-definition has been updated, the one or more natural-language security-definitions, the one or more machine-readable security-definitions and/or the one or more system-specific security-definitions may comprise a time-stamp indicating the time of their last update.

Furthermore, the one or more machine-readable security-definitions may comprise any of the group of constructs comprising users, roles, resources and/or access-privileges. This allows for a sufficiently precise but still generic representation of the corresponding natural-language security-definitions. In one aspect, the one or more machine-readable security-definitions may be defined in X$_A$CML. The extensible access control markup language (X$_A$CML) is a standardized declarative access control policy language implemented in XML.

The present invention also relates to a rule-repository for generating one or more system-specific security-definitions for one or more heterogeneous subsystems of a software system, the rule-repository comprising one or more rule-converters, wherein the rule-repository is adapted for performing any of the methods presented above.

Further advantageous modifications of embodiments of the method and the rule-repository of the invention are defined in further dependent claims.

Lastly, the present invention concerns a computer program comprising instructions for performing any of the methods presented above.

4. SHORT DESCRIPTION OF THE DRAWINGS

Figure 2:
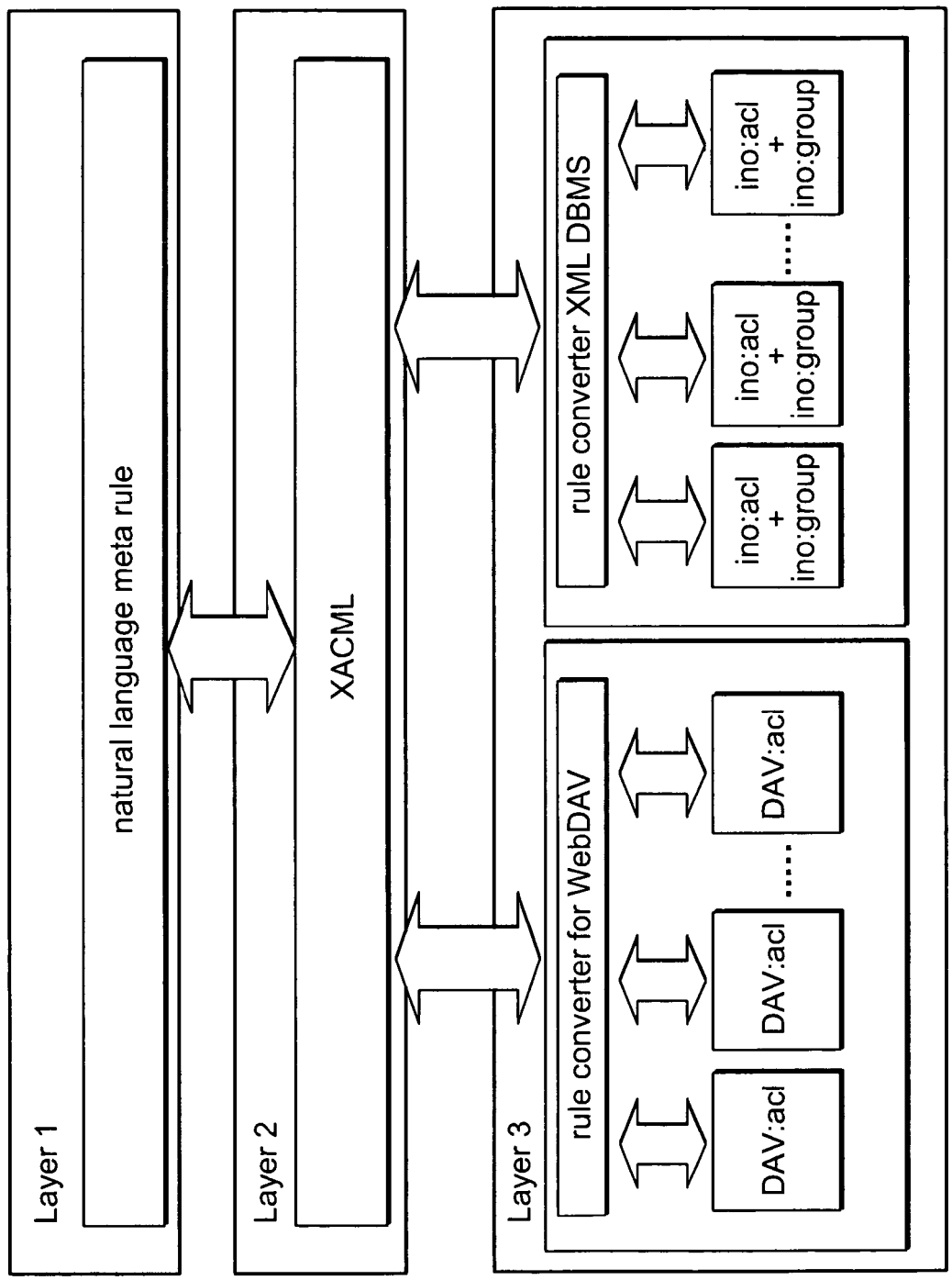

In the following detailed description, presently preferred embodiments of the invention are further described with reference to the following figures:

FIG. 1: A schematic view of a three-layered security-architecture according to an embodiment of the present invention;

FIG. 2: A concrete example of the security-architecture in the context of two subsystems and corresponding rule-converters;

FIG. 3: A code listing illustrating an exemplary natural-language security-definition and a mapping onto the layers 2 and 3;

FIG. 4: A code listing illustrating an exemplary machine-readable security-definition in X$_A$CML;

FIG. 5: A code listing illustrating an exemplary system-specific security-definition for a WebDAV repository; and FIGS. 6a-b: Code listings illustrating an exemplary system-specific security-definition for a Tamino XML database management system.

5. DETAILED DESCRIPTION

In the following, a presently preferred embodiment of the invention is described with respect to a three-layered security-architecture as schematically shown in FIG. 1. As can be seen, the security-architecture comprises an upper-most layer L1 comprising one or more natural-language security-definitions 100, a second layer L2 comprising one or more machine-readable security-definitions 200 as well as a mapping between the layers L1 and L2 (illustrated by the arrow between the security-definitions 100 and 200). The architecture further comprises a third layer L3 comprising one or more system-specific security-definitions 310, 311, 320 and 321. In the example of FIG. 1, the security-definitions 310 and 311 are specific for a subsystem S1 and serve to control access to resources S10 and S11 of the subsystem S1. Accordingly, the security-definitions 320 and 321 are specific for a subsystem S2 and serve to control access to resources S20 and S21. The connection between the machine-readable security-definitions 200 and the system-specific security-definitions 310, 311, 320, 321 is facilitated by corresponding rule-converters RC1 and RC2, which can generate layer-3-definitions from layer-2-definitions and vice-versa The rule-converters RC1, RC2 are preferably each adapted specifically for the respective subsystem S1, S2.

FIG. 1 only shows an extremely simplified scenario. It should be understood that the present invention also relates to much more complex scenarios, possibly comprising hundreds of heterogeneous subsystems each with hundreds of security-definitions.

Furthermore, it may be appreciated that the system-specific security-definitions 310, 311, 320, 321 may not only serve for access control to resources S10, S11, S20, S21, but to fulfill any kind of security intent. For example, the system-specific security-definitions 310, 311, 320, 321 may define rights to perform certain tasks such as user-management, administration, etc. or rights to start certain system-specific processes such as monthly billing, bank transfers, mail delivery, etc. Accordingly, the generation of such system-specific security-definitions 310, 311, 320, 321 may for example result in a written handout comprising directives to be followed by the personnel which performs the above tasks.

Typically, there is no one-to-one mapping of the security-definitions on the different layers, since a higher-layered security-definition might well result in multiple security-definitions on a lower layer. To be able to convert in both directions—from higher to lower and from lower to higher layer, an association between the security-definitions and their corresponding security-definitions on the other layers is given by the mappings depicted by the white arrows in FIG. 1. Maintaining these associations bears the advantage that they can be used for analytical purposes, as described further below.

In the following, various advantageous features of the present invention are illustrated in the context of the exemplary scenario in FIG. 2, where a company stores project-related information in a WebDAV repository S1 and in an XML database management system (DBMS) S2. The WebDAV repository S1 supports Web-DAV access control lists (ACLs) 310, 311 according to the internet standard RFC3744 and the XML DBMS S2 supports Tamino's structure-based ACLs 320, 321 of Applicant. As a representation for the machine-readable security-definitions 200, the above described XACML is used.

The overall security-intent, i.e. the natural-language security-definition 100 in this example is to "grant read access to all developers on the data relating to the project SYLT".

The data relating to the project SYLT are stored in the WebDAV repository S1 folder "http://webdavserver/projects/SYLT/" and in the XML DBMS S2 collection "SYLT". The developers are all members of the group "Developers" which is uniquely identified by the URL "http://webdavserver/groups/Developers" in the WebDAV repository S1 and by the name "DevelopersGroup" in the XML DBMS S2.

In the following, all information is stored in a rule-repository in XML syntax. It should, however, be appreciated that XML is only one of a wide variety of possible data formats. Also, the specific structure of the shown XML documents is not intended to limit the scope of the invention to this structure. Furthermore, the rule-repository may be an XML database such as Tamino of Applicant. However, it should be appreciated that any other kind of storage facility is suitable for the present invention.

FIG. 3 shows how the natural-language security-definition 100 introduced above is embedded in an XML element nlrule. Furthermore, the mapping of this natural-language security-definition 100 onto corresponding security-definitions on the layers L2 and L3 is incorporated into the XML document of FIG. 3. Depending on the chosen structures for storing the representations of the different layers, the mapping information may also be maintained in a separate set of mapping documents. In other embodiments, where the rule-repository may be a Tamino XML database, the information of the three layers may be stored in one collection comprising a doctype "nrule" for storing the natural-language security-definitions 100, a doctype "policy" for storing the machine-readable security-definitions 200 and a specific doctype for each type of subsystem S1, S2 of the software system. However, any other type of storage structure may be suitable for the present invention.

The corresponding machine-readable security-definition 200 is shown in FIG. 4, which in this example is formulated in XACML. As can be seen, an XACML rule generally follows the form to define a certain effect (cf. FIG. 4, line 3) of actions (cf. FIG. 4, lines 21-28) performed by subjects (cf. FIG. 4, lines 5-12) onto resources (cf. FIG. 4, lines 13-20). Accordingly, the XML document in FIG. 4 directly reflects the natural-language security-definition 100 ("grant read access to all developers on the data relating to the project SYLT"), in that it defines, in XACML syntax, a rule with the effect to permit (cf. FIG. 4, line 3) developers (cf. FIG. 4, line 8) to read (cf. FIG. 4, line 24) the resource SYLT (cf. FIG. 4, line 16). The mapping between these rules is defined in FIG. 3, line 7, in that a PolicyId-attribute of the machine-readable security-definition 200 is referenced by the natural-language security-definition 100.

The corresponding WebDAV ACL 310, 311 for the WebDAV repository S1 generated from the machine-readable security-definition 200 from FIG. 4 by the corresponding rule-converter RC1 is shown in FIG. 5. As can be seen, the rule-converter RC1 has generated the XML document in FIG. 5 so that it conforms to the WebDAV-specific format. It has replaced the layer-L2-subject developers by the URL "http://webdavserver/groups/Developers" in a D:principal-element and has inserted a D:privilege-element <D:read>, which corresponds to the layer-L2-action read. The layer-L2-resource SYLT is implicitly defined in this layer-L3-definition, since the definition is directly applied on the WebDAV folder "http://webdavserver/projects/SYLT/".

Similarly, FIG. 6a shows a structure-based ACL 320, 321 for the Tamino XML DBMS S2 generated by the rule-converter RC2. As can be seen, this ACL binds the resource SYLT to the access type read (cf. FIG. 6a, line 3). In Tamino, such a structure-based ACL is bound to the respective subject by a group-definition as depicted in FIG. 6b. As can be seen, the ACL (referenced by its name developers-readsylt) is bound to the group DevelopersGroup.

Accordingly, the FIGS. 5, 6a and 6b illustrate how the rule-converters RC1, RC2 can generate system-specific security-definitions 310, 311, 320, 321 from machine-readable security-definitions 200. It should be appreciated that although the above examples only show how the constructs of the machine-readable security-definitions 200 may be converted into constructs of WebDAV ACLs and Tamino structure-based ACLs, the present invention is not limited to these two specific data formats, but that any other rule-converter for other formats may operate in the present invention.

Since the information of all layers is represented in XML in the above example, XQueries may be formulated to analyze the information in order to research for security issues. It should be understood that any format other than XML and related query mechanisms may be employed in the present invention. The following sample queries assume that the security-definitions of all layers are collectively stored in a single collection "rules", however, other storage structures are equally possible.

The following query retrieves all layer-L3 security-definitions that are affected by the natural-language security-definition with the Id "DeveloperReadRule", according to the mappings:

```
declare namespace D="DAV:"
declare namespace ino="..."
let $rules := collection("rules")
let $nlrule in $rules/nlrule[@ruleId =
    'DevelopersReadRule']
let $layer3rules :=
    for $mapping in $nlrule/layermapping/layer3mappings
    return if ($mapping/@type = "WebDAV-acl")
        then $rules/D:acl[@id = $mapping/@id]
    else if ($mapping/@type = "Tamino-acl")
```

-continued

```
    then $rules/ino:acl[ino:aclname =
        $mapping/@id]
    else $rules/ino:group[ino:groupname =
        $mapping/@id]
return $layer3rules
```

The next query depicted below takes this set and selects those layer-L3 security-definitions that have been touched, i.e. updated, in the meantime. This preferably involves a function getTimestamp( ) that computes the time-stamp a rule has been last updated. The function is preferably implemented in a way that heeds the different ways the time-stamp may be represented in the system-specific security-definitions of the different subsystems (e.g. in that it always returns a value of type xs:datetime).

```
declare namespace D="DAV:"
declare namespace ino="..."
let $rules := collection("rules")
let $nlrule in $rules/nlrule[@ruleId =
    "DevelopersReadRule"]
let $layer3rules := ...
let $touchedLayer3rules
    [getTimestamp(.) > getTimestamp($nlrule)]
return $touchedLayer3rules
```

The last query takes this set and selects those natural-language security-definitions which caused the layer-L3 security-definitions to be updated:

```
declare namespace D="DAV:"
declare namespace ino="..."
let $rules := collection("rules")
let $nlrule in $rules/nlrule[@ruleId =
    "DevelopersReadRule"]
let $touchedLayer3rules
    [getTimestamp(.) > getTimestamp($nlrule)]
for $touchedRule in $touchedLayer3rules
return $rules/nlrule[getTimestamp(.) =
    getTimestamp($touchedRule)
    and $touchedRule = getLayer3Rules(.)]
```

This query presumes that a natural-language security-definition has caused a layer-L3 security-definition to be updated, if both security-definitions have the same time-stamp. In other scenarios, it may be feasible to e.g. introduce a transaction ID to make the determination more precise. The above query furthermore uses a function getLayer3Rules( ). This exemplary function computes all layer-L3 security-definitions for a natural-language security-definition as demonstrated in the first query.

In summary, the three queries depicted above retrieve, for a given natural-language security-definition, the affected natural-language security-definitions, which have manipulated the same system-specific security-definitions and thus allow for an efficient analysis of the overall security set of the software system.

The invention claimed is:

1. A method for generating system-specific security-definitions for a plurality of heterogeneous subsystems by using a computing system that includes at least one processor, the system-specific security-definitions associated with respective subsystems of the plurality of heterogeneous subsystems, the plurality of heterogeneous subsystems including a first heterogeneous subsystem, the method comprising:

storing a plurality of natural-language security-definitions in a rule-repository that is stored in a storage medium;

storing a plurality of machine-readable security-definitions in the rule-repository stored on the storage medium, the plurality of machine-readable security-definitions including a first machine-readable security-definition;

storing, in the rule-repository stored on the storage medium, a first mapping of each one of the plurality of natural-language security-definitions onto at least one of the plurality of machine-readable security-definitions;

storing, in the rule-repository stored on the storage medium, a second mapping that associates the first machine-readable security-definition to an indication of a first system-specific security-definition;

associating a respective rule-converter to each one of the plurality of heterogeneous subsystems;

generating, via the computing system, the first system-specific security-definition for the first heterogeneous subsystem from at least the first machine-readable security-definition by using the respective rule-converter associated with the first heterogeneous subsystem, wherein the generating is based on the second mapping, storing a new system-specific security-definition in the rule-repository; and generating, via the computing system, a second machine-readable security-definition from the new system-specific security-definition by the respective rule-converter according to the second mapping.

2. The method of claim 1, further comprising:
selecting at least one of the natural-language security-definitions; and
retrieving the first system-specific security-definitions according to the first and second mapping.

3. The method of claim 2, further comprising:
updating the first system-specific security-definition;
selecting the updated first system-specific security-definition; and
retrieving a natural-language security-definition which has updated the selected system-specific security-definition.

4. The method of claim 1, further comprising:
selecting at least one of the system-specific security-definitions; and
retrieving affected natural-language security-definitions according to the first and second mapping.

5. The method of claim 1, further comprising:
updating a second natural-language security-definition and/or a second machine-readable security-definition; and
updating a corresponding system-specific security-definitions by the one or more rule-converters in accordance with the updated second natural-language security-definition and/or the second machine-readable security-definition.

6. The method of claim 1, wherein the plurality of natural-language security-definitions, the plurality of machine-readable security-definitions and/or the first system-specific security-definition comprise a time-stamp.

7. The method of claim 1, wherein the first machine-readable security-definition comprises any of the group of constructs comprising users, roles, resources and/or access-privileges.

8. The method of claim 1, wherein the first machine-readable security-definition is defined in XACML.

9. The method of claim 1, wherein the second mapping is a 1:n mapping, a 1:1 mapping, or a n:m mapping.

10. A computing apparatus for generating system-specific security-definitions for a plurality of heterogeneous subsystems, the system-specific security-definitions associated with respective subsystems of the plurality of heterogeneous subsystems, the plurality of heterogeneous subsystems including a first heterogeneous subsystem, the apparatus comprising:
a storage medium system; and
a processing system that includes at least one processor, the processing system configured to:
store a plurality of natural-language security-definitions in a rule-repository storage medium;
store a plurality of machine-readable security-definitions in the rule-repository storage medium, the plurality of machine-readable security-definitions including a first machine-readable security-definition;
store, in the rule-repository storage medium, a first mapping of each one of the plurality of natural-language security-definitions onto at least one of the plurality of machine-readable security-definitions;
store, in the rule-repository storage medium, a second mapping that associates the first machine-readable security-definition to an indication of a first system-specific security-definition;
associate a respective rule-converter to each one of the plurality of heterogeneous subsystems;
generate, via the computing system, the first system-specific security-definition for the first heterogeneous subsystem from at least the first machine-readable security-definition by using the respective rule-converter associated with the first heterogeneous subsystem, wherein the generating is based on the second mapping,
store a new system-specific security-definition in the rule-repository; and
generate a second machine-readable security-definition from the new system-specific security-definition by the respective rule-converter according to the second mapping.

11. The apparatus of claim 10, wherein the one or more rule-converters are adapted for generating, for each construct of the one or more machine-readable security-definitions at least one corresponding construct specific to the one or more system-specific security-definitions.

12. The apparatus of claim 10, wherein the first and/or the second mapping is stored in the one or more natural-language security-definitions and/or the one or more machine-readable security-definitions.

13. The apparatus of claim 10, wherein the first and/or the second mapping is stored in at least one separate mapping document.

14. The apparatus of claim 10, wherein the plurality of natural-language security-definitions, the plurality of machine-readable security-definitions, and the first system-specific security-definition are stored in an XML format.

15. The computing apparatus of claim 10, wherein the second mapping is a 1:n mapping, a 1:1 mapping, or a n:m mapping.

16. A non-transitory computer readable storage medium storing instructions for use with a computing system for generating system-specific security-definitions for a plurality of heterogeneous subsystems, the computing system including at least one processor, the system-specific security-definitions associated with respective subsystems of the plurality of heterogeneous subsystems, the plurality of heterogeneous subsystems including a first heterogeneous subsystem, the stored instructions comprising instructions that are configured to:
store a plurality of natural-language security-definitions in a rule-repository storage medium;
store a plurality of machine-readable security-definitions in the rule-repository storage medium, the plurality of machine-readable security-definitions including a first machine-readable security-definition;
store, in the rule-repository storage medium, a first mapping of each one of the plurality of natural-language security-definitions onto at least one of the plurality of machine-readable security-definitions;
store, in the rule-repository storage medium, a second mapping that associates the first machine-readable security-definition to an indication of a first system-specific security-definition;
associate a respective rule-converter to each one of the plurality of heterogeneous subsystems;
generate, via the computing system, the first system-specific security-definition for the first heterogeneous subsystem from at least the first machine-readable security-definition by using the respective rule-converter associated with the first heterogeneous subsystem, wherein the generating is based on the second mapping,
store a new system-specific security-definition in the rule-repository; and
generate a second machine-readable security-definition from the new system-specific security-definition by the respective rule-converter according to the second mapping.

17. The medium of claim 16, wherein the second mapping is a 1:n mapping, a 1:1 mapping, or a n:m mapping.

* * * * *